US009383261B2

(12) United States Patent
Page

(10) Patent No.: US 9,383,261 B2
(45) Date of Patent: Jul. 5, 2016

(54) METHOD OF ELIMINATING SPURIOUS SIGNALS AND A RELATIVE NAVIGATION SYSTEM

(71) Applicant: GE Aviation Systems LLC, Grand Rapids, MI (US)

(72) Inventor: Jerry Lynne Page, Alto, MI (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 0 days.

(21) Appl. No.: 14/303,639

(22) Filed: Jun. 13, 2014

(65) Prior Publication Data

US 2015/0362369 A1    Dec. 17, 2015

(51) Int. Cl.
 *G01J 4/00* (2006.01)
 *G01J 4/04* (2006.01)
 *G01C 21/00* (2006.01)

(52) U.S. Cl.
 CPC . *G01J 4/04* (2013.01); *G01C 21/00* (2013.01); *G01J 2004/002* (2013.01)

(58) Field of Classification Search
 CPC .............................. G01J 4/04; G01J 2004/002
 USPC ........................................................ 356/364
 See application file for complete search history.

(56) References Cited

U.S. PATENT DOCUMENTS

| 7,681,839 | B2 | 3/2010 | Mickley et al. |
| 2004/0130731 | A1 | 7/2004 | Yamaguchi |
| 2005/0192721 | A1* | 9/2005 | Jouppi ................. G05D 1/0011 701/24 |
| 2009/0278736 | A1* | 11/2009 | Cohen et al. ............. 342/357.08 |
| 2011/0153205 | A1* | 6/2011 | Stimac et al. ................. 701/207 |
| 2014/0029005 | A1* | 1/2014 | Fiess et al. .................... 356/364 |
| 2014/0163557 | A1* | 6/2014 | Beyar ................. A61B 17/1703 606/80 |
| 2015/0162668 | A1* | 6/2015 | Oppenlaender et al. ...... 343/776 |

FOREIGN PATENT DOCUMENTS

| GB | 2514223 A | 11/2014 |
| WO | 2013025842 A1 | 2/2013 |

OTHER PUBLICATIONS

GB Combined Search and Exam Report issued Nov. 30, 2015 in relation to corresponding GB Application 1510411.0.

* cited by examiner

*Primary Examiner* — Kara E Geisel
*Assistant Examiner* — Hina F Ayub
(74) *Attorney, Agent, or Firm* — GE Global Patent Operation; William S. Munnerlyn

(57) ABSTRACT

A relative navigation system and a method of eliminating spurious signals that may be received by a relative navigation system having a first object and a second object including projecting polarized light having a first orientation to form at least one grid line projecting into space from the first object.

15 Claims, 5 Drawing Sheets

METHOD OF ELIMINATING SPURIOUS SIGNALS AND A RELATIVE NAVIGATION SYSTEM

BACKGROUND OF THE INVENTION

Relative navigation systems are useful for various applications such as autonomous vehicle navigation such as in a warehouse or factory environment, mid-air refueling, and space docking. In some applications, only the range between two objects is required. In other applications, both the range and the relative attitude (pitch, yaw, and roll) between two objects are required. In such applications high reliability, low weight, and low cost may be desirable.

BRIEF DESCRIPTION OF THE INVENTION

In one embodiment, the invention relates to a method of eliminating spurious signals received by a relative navigation system, including projecting into space from a grid generator on a first object a polarized light having a first orientation to form at least one grid line, detecting, at the second object, the polarized light having the first orientation, and filtering, at the second object, polarized light having a second orientation, which is different from the first orientation.

In another embodiment, the invention relates to a navigation system, including a grid generator configured to project into space polarized light having a first orientation to form a plurality of grid lines that create a grid defining a first relative reference frame and a detector module configured to detect the polarized light having the first orientation and filter polarized light having a second orientation.

DESCRIPTION OF EMBODIMENTS OF THE INVENTION

Figure 1:
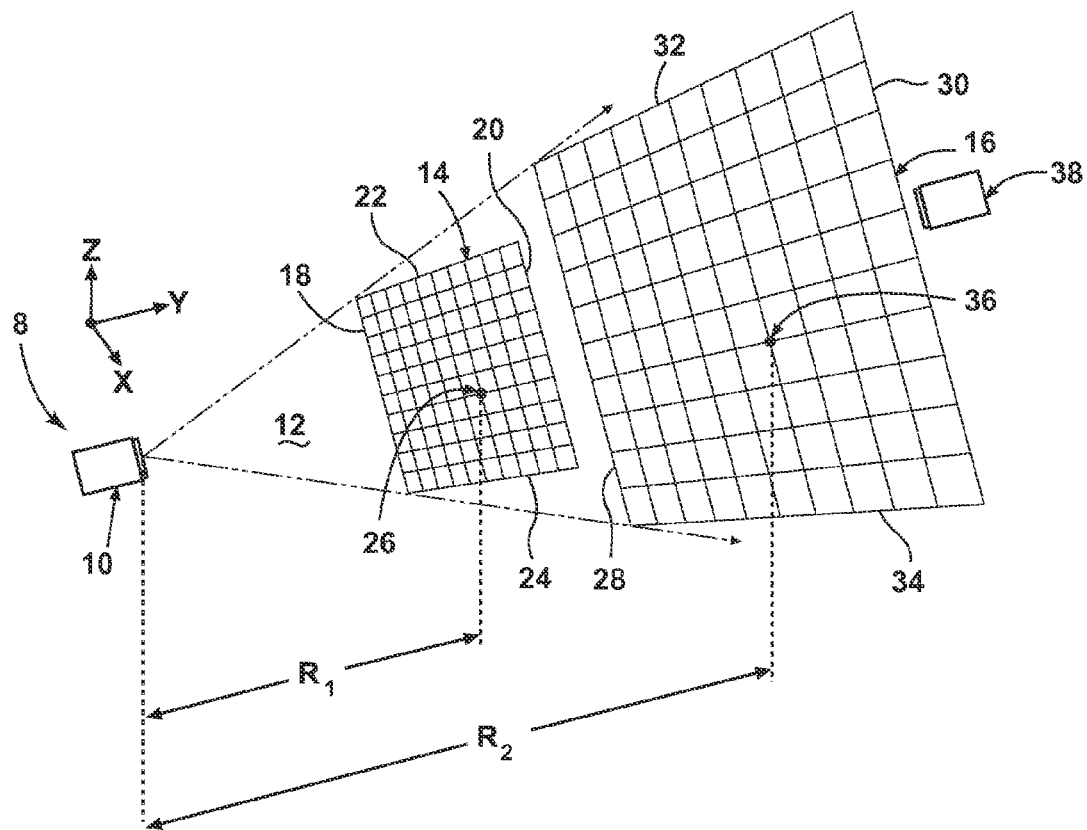
FIG. 1 is a schematic illustration of first and second objects, each having their own relative reference frame, and capable of navigation according to an embodiment of the invention.

FIG. 1 illustrates a relative navigation system 8 having a first object or grid generator 10, which projects a grid, such as a plurality of intersecting lines, into space within a field of signal 12. As illustrated, the projected grid comprises intersecting lines. At some distance away from the grid generator 10, these intersecting lines are observed as a grid in space, with the size of the grid increasing away from the grid generator 10.

For description purposes, the grid generator 10 may be thought of as projecting intersecting lines substantially in the y direction of the illustrated coordinate system. If one were to observe the projection of intersecting lines in the x-z plane at some distance $R_1$ away from the grid generator 10, one would observe a first grid 14. If one were to observe the same projection of intersecting lines at a distance $R_2$, which is greater than the first distance $R_1$ in the x-z plane, one would observe a second grid 16, which appears relatively larger than the first grid 14.

The first grid 14 at distance $R_1$ away from the grid generator 10 is spatially bound in the horizontal direction by a first vertical line 18 and a second vertical line 20. There exists a plurality of vertical lines spatially and temporally generated in between the first vertical line 18 and the second vertical line 20. The first grid 14 at a distance $R_1$ away from the grid generator 10 is spatially bound in the vertical direction by a first horizontal line 22 and a second horizontal line 24. There exists a plurality of horizontal lines spatially and temporally between the first horizontal line 22 and the second horizontal line 24. The distance $R_1$ can be any distance between the first grid 14 and the grid generator 10. For convenience, the distance is determined between a point 26 on the first grid 14 and the grid generator 10 as shown.

The second grid 16 at distance $R_2$ away from the grid generator 10 is for all practical purposes the same as the first grid 14, but at a further distance from the grid generator 10 than the first grid 14. The second grid 16 is spatially bound in the horizontal direction by a first vertical line 28 of the second grid 16 and a second vertical line 30 of the second grid 16. There exists a plurality of vertical lines spatially and temporally generated in between the first vertical line 28 of the second grid 16 and the second vertical line 30 of the second grid 16. The second grid 16 at a distance $R_2$ away from the grid generator 10 is spatially bound in the vertical direction by a first horizontal line 32 of the second grid 16 and a second horizontal line 34 of the second grid 16. There exists a plurality of horizontal lines spatially and temporally between the first horizontal line 32 of the second grid and the second horizontal line 34 of the second grid 16. A point 36 on the second grid 16 is shown.

The similarity of the grids 14 and 16 becomes apparent in the case of projected grid lines, where the second grid 16 is formed by the same lines forming the first grid 14, except the second grid 16 is observed at a further distance from the grid generator 10, making the second grid 16 appear larger than the first grid 14. In this sense, the second grid 16 is the appearance of the grid lines generated by the grid generator 10 at the distance $R_2$ whereas the first grid 14 is the appearance of the grid lines at the distance R1.

The grids 14 and 16 may be of any number of lines. As illustrated, they are comprised of ten vertical lines by ten horizontal lines. A grid comprised of a greater number of intersecting lines may result in improved detection angular resolution for a fixed field of signal 12 and distance from the grid generator 10 than a grid comprised of a fewer number of intersecting lines. The grids 14 and 16 are depicted as a square shape, but this is not a requirement for the methods and apparatus of this invention. The grid can be any shape including rectangular, oval, or circular. Furthermore, the intersecting lines of the grids 14 and 16 are depicted as orthogonal; however, this is not a requirement for the methods and apparatus of the present invention. The angles between the intersecting lines may be right angles, acute angles, or obtuse angles in different parts of the grid.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

Figure 2:
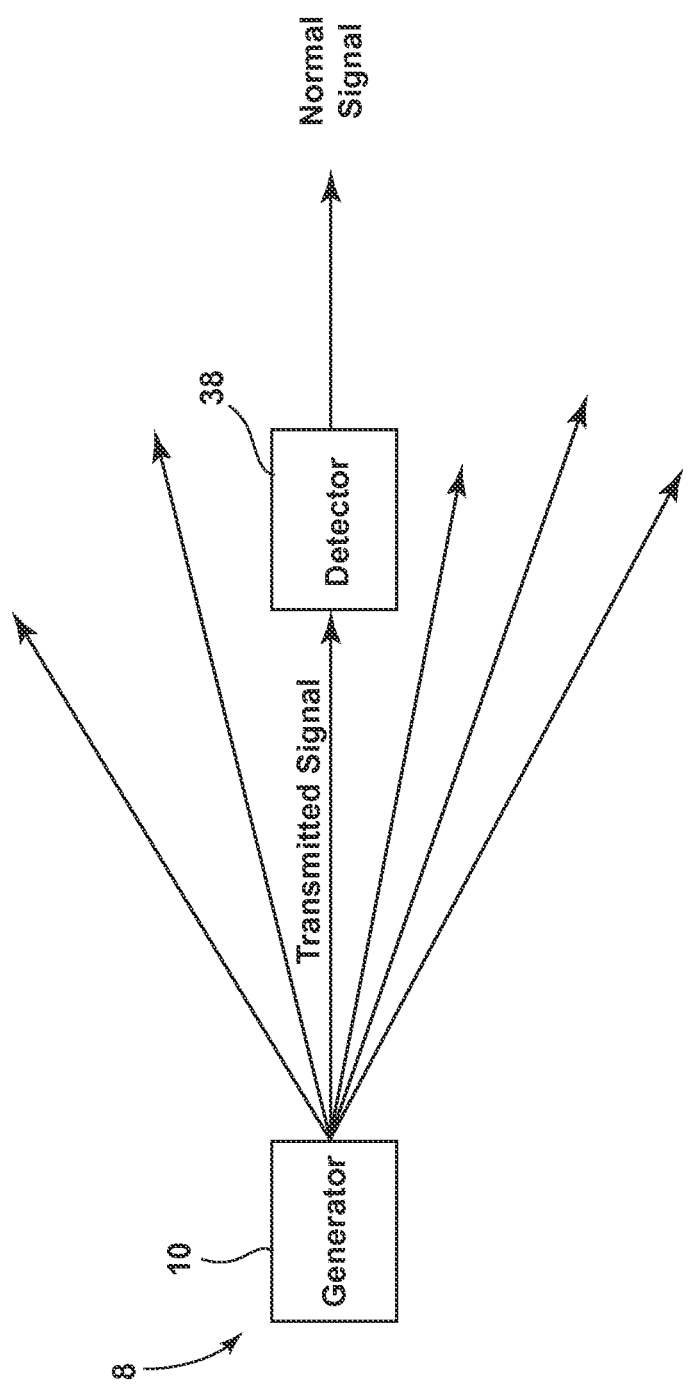
FIG. 2 is a schematic illustration of a direct signal.
Figure 3:
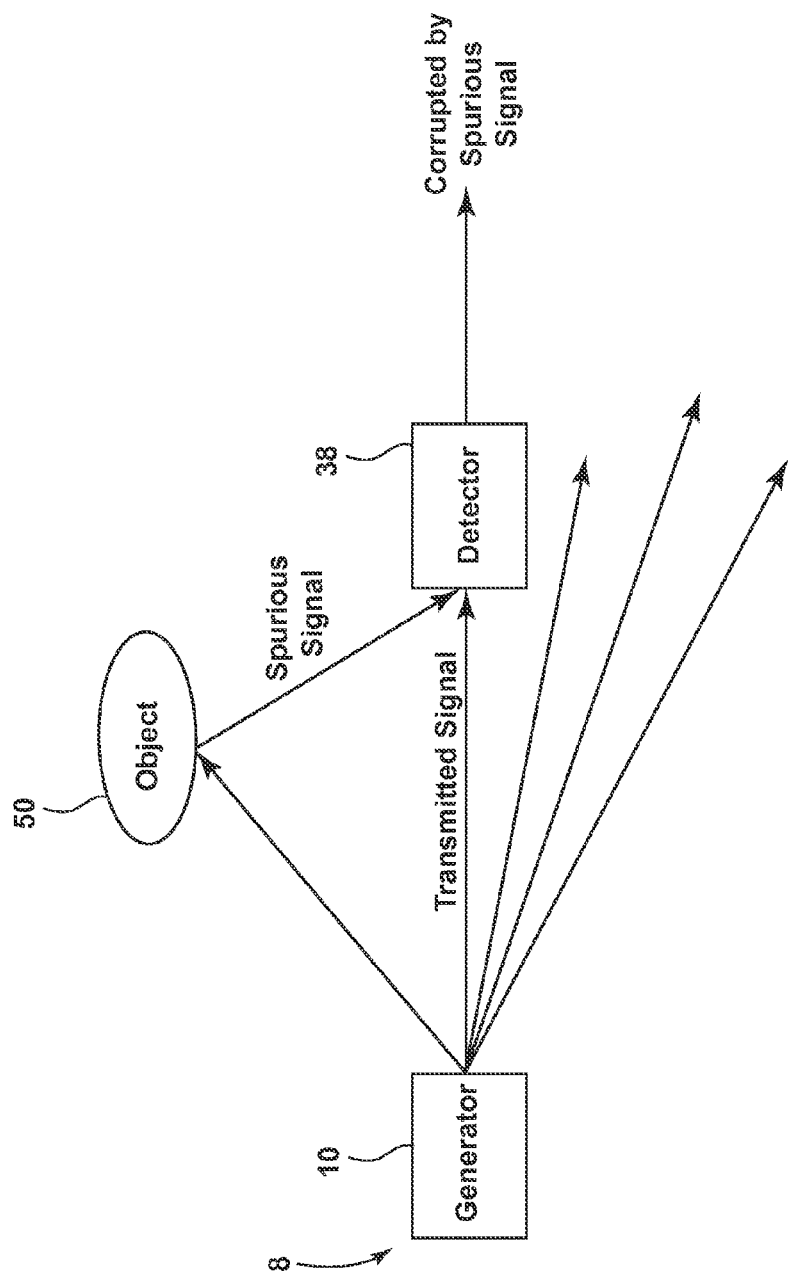
FIG. 3 is a schematic illustration of a spurious signal.

A second object or detector module 38 may lie within the field of signal 12 of the grid generator 10, enabling the detector module 38 to "see" the grid. The detector module 38 may be configured in any suitable manner to "see" the grid. By way of non-limiting example, the grid generator 10 may use a scanning laser to create a two dimensional grid in space. As shown in FIG. 2, the ideal environment is that the transmitted light propagates directly to the detector module 38 where the transmitted grid information is detected and decoded to provide the needed spatial information. However, as illustrated in FIG. 3, there exist situations where the transmitted grid light does not directly propagate to the detector module 38. Instead, the transmitted grid light is reflected from an object 50 that is also in the field of the transmitted grid. The reflected information is then "seen" by the detector module 38. These spuriously reflected signals or multipath signals create erroneous information when they are received by the detector module 38. Reflections from object(s) 50 in the transmitted grid field, which reach the detector module 38, may appear as valid signals. The detector module 38 cannot identify that these signals came from a path other than directly from the grid generator 10. Because these signals represent where the reflective object 50 is positioned in the two dimensional grid, it misleads the relative navigation system 8 about the position of the detector module 38 because it now appears to be in the same position as the reflective object 50. More specifically, the determination of position is a function of the position coordinates in the grid, the object 50 reflects the transmission with the object's position encoded on it. If the detector module 38 only sees the signal with the object's position encoded on it, it captures the code for the object's position. Further, a problem occurs if the object 50 is close enough to the detector module 38 such that the reflected signal and the direct signal hit the detector module 38 in a somewhat overlapping period. In such an instance, the combined signal is not decodable since the reflected transmission and the direct transmission overlap in time and would be garbled. The object 50 may include any object upon which the transmitted signal may be reflected including, by way of non-limiting examples that reflections may come from the drogue, vehicle, and detector mechanical structures, vehicle surfaces, propellers, etc.

Figure 4:
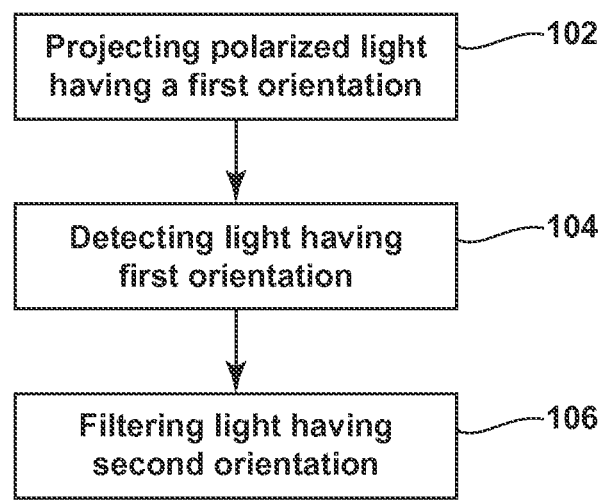
FIG. 4 is a flow chart showing a method of eliminating spurious reflected signals according to an embodiment of the invention.

Embodiments of the invention relate to discriminating and rejecting these unwanted spurious or multipath signals from those that propagated directly from the grid generator to the detector module. In accordance with an embodiment of the invention, FIG. 4 illustrates a method 100, which may be used for projecting a grid into space and eliminating spurious signals. It will be understood that the term "space" is not limited to outer space and that the grid may be projected into any suitable space including indoors and outdoors. The method 100 begins at 102 with projecting polarized light having a first orientation to form at least one grid line projecting into space from the first object or grid generator 10. In this manner, the relative navigation system 8 creates a signal with a defined state of polarization. This may include projecting from an illumination source a beam of non-polarized light. The single beam of non-polarized light may be passed through a beam shaper. The beam of non-polarized light may be polarized by passing the beam of non-polarized light through a polarizer. Alternatively, projecting polarized light having a first orientation may include projecting from an illumination source a beam of polarized light. In such an instance, the illumination source may include a highly polarized laser.

As the term polarization is used in this description, it is meant to refer to the polarization state of light as defined by the orientation of its electric field as the light wave propagates. Light polarization states may vary by any desired degree of variation in the two orientations. However, for ease of use, two different orientations may be selected as orthogonal pairs such that one polarization may be filtered with an appropriately designed polarization filter or polarizer and still allow the corresponding orthogonal polarization to be transmitted. For example, linearly polarized light can have its electric field polarized vertically or horizontally. Since the two electric field vectors are perpendicular or orthogonal they cannot interfere with each other. A polarization filter or polarizer may pass one state of polarization and filter the orthogonal polarization. For linearly polarized light, the polarizer must be aligned with the electric field vector in order to pass one linear polarization and filter the orthogonal polarization. A disadvantage of using linear polarization and polarizers is that the proper orientation must be maintained to keep the polarizations separated. For example, if the first object is transmitting horizontally polarized light and the second object has two linear polarizer/detector one for the horizontal polarization and one for vertically polarized light and if the second object were to roll about the optic axis, then the two polarizer/detectors would each "see" a component of the horizontally and vertically polarized transmitted beam and the separation of the two beams would be lost.

Thus, while the transmitted light, at 102, may be linearly polarized it is contemplated that for many applications circular polarizations, rather than linear polarizations, may be more useful since circular polarizations are not sensitive to rotations about an optic axis. Circularly polarized light has an electric field vector that rotates about the axis of light propagation. The orthogonal polarization states have electric field vectors that rotate clockwise and counterclockwise and are called right hand circular polarization (RHCP) and left hand circular polarization (LHCP) respectively. Further, when polarized light is reflected, the angular orientation of the major polarization axis with respect to a line perpendicular, the plane of incidence changes sign. Further, the direction of rotation of the electric field or the handedness reverses. In the instance of circularly polarized light, there is no defined major axis as both major and minor axes are equal, this is unlike elliptically polarized light. Therefore, the only effect of reflecting circularly polarized light is to change its handedness. Thus, if the light being transmitted as 102 is RHCP any reflected light will be LHCP.

At 104, the method may continue by detecting, at the second object or detector module 38, the polarized light having the first orientation. This may include allowing the polarized light having the first orientation to pass through a matched polarizer at the second object. At 106, the method includes filtering, at the second object or detector module, polarized light having a second orientation. For example, the filtering may include optically filtering and a polarization filter that matches the predefined state of polarization of the light emitted at 102 may be included at the detector module. Such a polarization filter may pass the light propagating directly from the grid generator and reject the unwanted light reflected from objects within the grid transmission field that may also impinge on the detector module. In this manner, the detector module may receive signals that match the predefined state of polarization and may filter out signals that do not match the predefined state of polarization. In this manner, spurious signals may be mitigated. It will be understood that filtering the polarized light having the second orientation may include completely eliminating the light having the second orientation or reducing the amount of light having the second orientation that is detected.

It will be understood that the method of eliminating spurious signals is flexible and that the method 100 illustrated is merely for illustrative purposes. For example, the sequence of steps depicted is for illustrative purposes only, and is not meant to limit the method 100 in any way, as it is understood that the steps may proceed in a different logical order, including that the detecting and filtering may occur simultaneously, or additional or intervening steps may be included without detracting from the embodiments of the invention. For example, the method 100 may include modulating the projected light to carry a first grid word comprised of a number of modulated bits to identify the at least one grid line within a grid by the modulated first grid word. The method 100 may include projecting polarized light having a first orientation to form a plurality of grid lines including projecting into space a horizontal grid line and a vertical grid line that intersect to form a portion of the grid. Further still, additional intersecting horizontal and vertical grid lines may be projected to form additional portions of the grid. The additional intersecting horizontal and vertical grid lines may be physically spaced from each other in space. Such additional lines may also be modulated.

Figure 5:
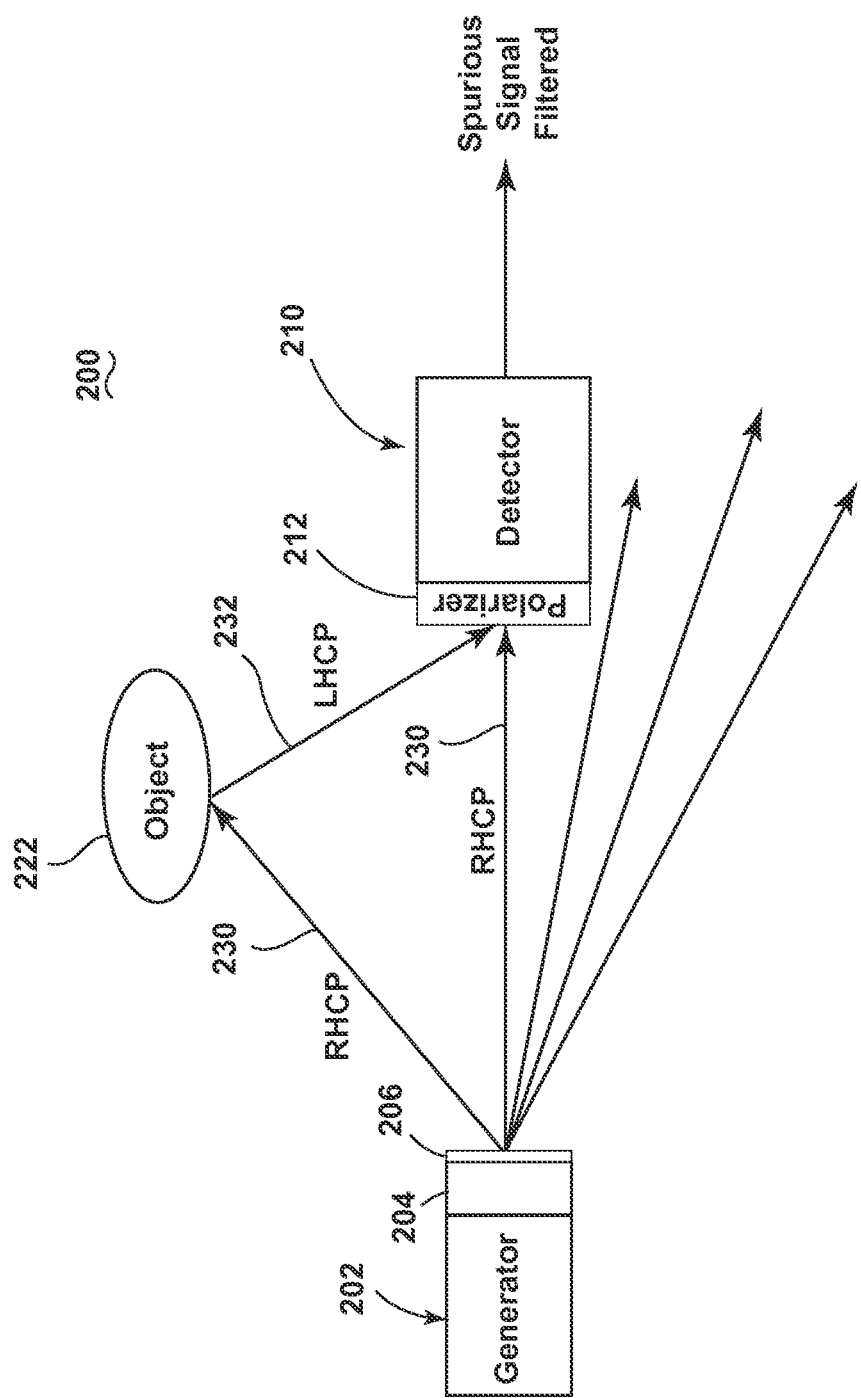
FIG. 5 is a schematic illustration of a relative navigation system that is capable of eliminating spurious reflected signals according to an embodiment of the invention.

FIG. 5 illustrates a relative navigation system 200 capable of operating according to an embodiment of the method of 100. The relative navigation system 200 is similar to the relative navigation system 8, previously described, with it being understood that the description of the like parts applies to the relative navigation system 200 unless otherwise noted. A first object of the relative navigation system 200 or grid generator 202 of the relative navigation system 200 may include a beam generator 204 such as a laser or any suitable illumination source. A horizontal grid line and/or a vertical grid line may be projected from the beam generator 204. The light emerging from the beam generator 204 may be polarized to a high degree. Alternatively, a polarizer 206 may be inserted somewhere after the bean generator 204 such that the beam of light may be polarized when it passes through the polarizer 206. Regardless of whether a separate polarizer is used the grid generator 202 will be considered to project into space polarized light having a first orientation to form a plurality of grid lines that create a grid defining a first relative reference frame.

A second object of the relative navigation system 200 or detector module 210 is also included in the relative navigation system 200. The detector module 210 is configured to detect polarized light and filter polarized light having a second orientation, which is different from the first orientation. For example, the detector module 210 has been illustrated as including a polarizer 212 that allows light having the first orientation to pass through the polarizer 212 such that it may be detected. The polarizer 212 also filters light having the second orientation. The polarizer 212 may completely eliminate the light having the second orientation such that it is not detected at all by the detector module. It is contemplated that the polarizer 212 may not eliminate all of the light having the second orientation but it will reduce any impact of any reflections that reach the detector module 210.

Thus, depending on the polarization of the light, the light either will pass through the polarizer 212 to the remainder of the detector module 210 or will be filtered. In the relative navigation system 200, the polarizer 212 is a matching polarizer to the light having the first orientation such that it allows the light having the first orientation to pass through the polarizer 212 such that it may form a portion of the grid.

In the illustrated example, the light 230 being projected by the grid generator 202 is RHCP. As explained above, the only effect of reflecting circularly polarized light is to change its handedness. When the RHCP light is reflected, as illustrated by the light 230 being reflected by the object 222, the handedness reverses. That is, any light that reflects from a single surface of the object 222 will become the orthogonal polarization as shown at 232. For example, in the figure the RHCP signal is changed to a LHCP signal, at 232, upon reflection from the object 222. It will be understood that the RHCP signal that is not reflected remains a RHCP signal. In the illustrated example, the matched polarizer 212 is a RHCP polarizer, which allows the direct signal to pass through the polarizer 212 so that the light may be detected by the detector module 210. However, the reflected light 232, which is now LHCP will be filtered by the RHCP polarizer 212. In this manner, the polarized beam of light, which has been reflected and therefore has a second orientation, will be filtered from the detector module 210 by the polarizer 212.

It will be understood that the matching filter may be any suitable optical filter based on the light that is transmitted from the grid generator. For example, if the grid generator emits LHCP light then the matching filter may be a LHCP polarizer, etc. It will also be understood that filtering the reflected signals with an optical filter is one example of how the polarized light having the second orientation may be filtered. It is contemplated that the polarized light having the second orientation may be filtered in any suitable manner. For example, a sensor may detect the polarization and electronically filter or process out the signal having the second orientation. Further, the signals may be filtered through processing such as by using reasonableness criteria in the software to ignore some reflected signals based on timing or unrealistic jumps in position.

The above-described embodiments provided a variety of benefits including that the embodiments eliminate or reduce any impact of any reflection that reaches the detector module thereby reducing noise and position errors within the relative navigation system. The above-described embodiments may include the application of commercially available circular polarizers, which provide an inexpensive way of ensuring that the relative navigation system has robust performance in cluttered environments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of eliminating spurious optical signals received by a relative navigation system, the method comprising:

projecting into space from a grid generator, on a first object, a polarized light having a first orientation to form at least one optical grid line for an optical grid defining a first relative reference frame;

detecting, by a detector module at a second object having a second relative reference frame, the polarized light having the first orientation; and filtering, at the second object, polarized light having a second orientation, which is different from the first orientation to eliminate spurious optical signals having the second orientation, which would otherwise appear as directly propagated light signals to the detector module; and wherein the detector module determines its position within the first relative reference frame based on the detected light having the first orientation.

2. The method of claim 1 wherein projecting polarized light having the first orientation comprises projecting from an illumination source a beam of non-polarized light.

3. The method of claim 2 wherein projecting polarized light having the first orientation further comprises polarizing the beam of light by passing the beam of light through a polarizer.

4. The method of claim 1 wherein projecting polarized light having the first orientation comprises projecting from an illumination source a beam of polarized light.

5. The method of claim 1 wherein filtering comprises optically filtering the polarized light.

6. The method of claim 5 wherein detecting the polarized light having the first orientation comprises allowing the polarized light having the first orientation to pass through a matched polarizer at the second object.

7. The method of claim 6 wherein filtering polarized light having the second orientation comprises the matched polarizer blocking the light having the second orientation.

8. The method of claim 6 wherein filtering the polarized light having the second orientation comprises reducing an amount of light having the second orientation that is detected.

9. The method of claim 1 wherein the projecting polarized light having the first orientation to form at least one grid line comprises projecting polarized light having the first orientation to form a plurality of grid lines.

10. The method of claim 9 wherein the plurality of grid lines comprise a horizontal grid line and a vertical grid line that intersect to form a portion of the grid.

11. The method of claim 10, further comprising projecting into space additional intersecting horizontal and vertical grid lines to form additional portions of the grid.

12. An optical relative navigation system, comprising:
    a grid generator configured to project into space polarized light having a first orientation to form a plurality of grid lines that create a grid, having position coordinates, defining a first optical relative reference frame; and
    a detector module configured to detect polarized light having the first orientation and filter polarized light having a second orientation, which is different from the first orientation; and
    wherein the grid generator and the detector module each have their own relative reference frame and the detector module is configured to determine its position within the first optical relative reference frame based on the position coordinates in the detected polarized light.

13. The relative navigation system of claim 12 wherein the detector module comprises a polarizer that allows light having the first orientation to pass through the polarizer to be detected and blocks light having the second orientation.

14. The relative navigation system of claim 13 wherein the polarizer completely eliminates the light having the second orientation such that it is not detected.

15. The relative navigation system of claim 13 wherein the polarizer is a right hand circular polarizer.

* * * * *